United States Patent [19]

Georgeson

[11] 3,987,815
[45] Oct. 26, 1976

[54] TANK DEPLETION FLOW CONTROLLER

[75] Inventor: Melvin A. Georgeson, Idaho Falls, Idaho

[73] Assignee: The United States of America as represented by the United States Energy Research and Development Administration, Washington, D.C.

[22] Filed: July 1, 1975

[21] Appl. No.: 592,485

[52] U.S. Cl. .................................. 137/486; 73/302
[51] Int. Cl.² ........................................ F16K 31/00
[58] Field of Search ............. 73/302; 137/386, 403, 137/486

[56] References Cited
UNITED STATES PATENTS

| | | |
|---|---|---|
| 2,012,351 | 8/1935 | Riney et al. ......................... 137/486 |
| 2,604,778 | 7/1952 | Marquardt ............................ 73/302 |
| 2,613,535 | 10/1952 | Born .................................. 73/302 |
| 2,899,969 | 8/1959 | Kirby ................................. 137/403 |
| 3,012,373 | 12/1961 | Willis ................................. 137/386 |
| 3,174,504 | 3/1965 | Rosenbrock et al. ............... 137/486 |
| 3,200,971 | 8/1965 | Trethewey .......................... 137/403 |
| 3,271,993 | 9/1966 | Whitson .............................. 137/486 |
| 3,380,463 | 4/1968 | Trethewey .......................... 73/302 |
| 3,470,902 | 10/1969 | Hackman ............................ 137/386 |
| 3,499,580 | 3/1970 | Smith .................................. 73/302 |
| 3,532,956 | 10/1970 | Simon ................................. 137/386 |
| 3,552,428 | 1/1971 | Pemberton ......................... 137/486 |

Primary Examiner—Martin P. Schwadron
Assistant Examiner—G. L. Walton
Attorney, Agent, or Firm—John A. Horan; Arthur A. Churm; Hugh W. Glenn

[57] ABSTRACT

A flow control system includes two bubbler tubes installed at different levels within a tank containing such as radioactive liquid. As the tank is depleted, a differential pressure transmitter monitors pressure differences imparted by the two bubbler tubes at a remote, shielded location during uniform time intervals. At the end of each uniform interval, balance pots containing a dense liquid are valved together to equalize the pressures. The resulting sawtooth-shaped signal generated by the differential pressure transmitter is compared with a second sawtooth signal representing the desired flow rate during each time interval. Variations in the two signals are employed by a control instrument to regulate flow rate.

8 Claims, 3 Drawing Figures

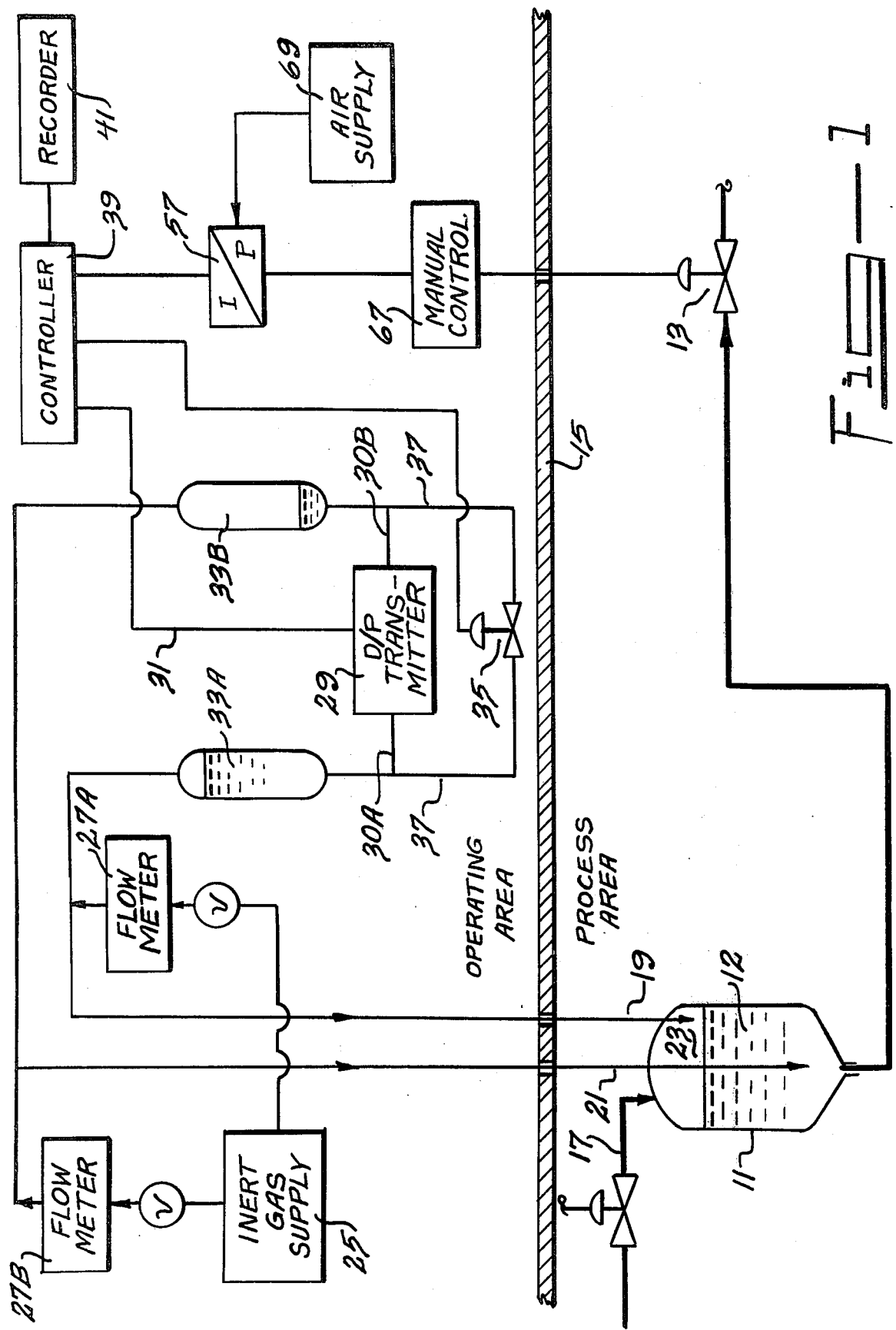

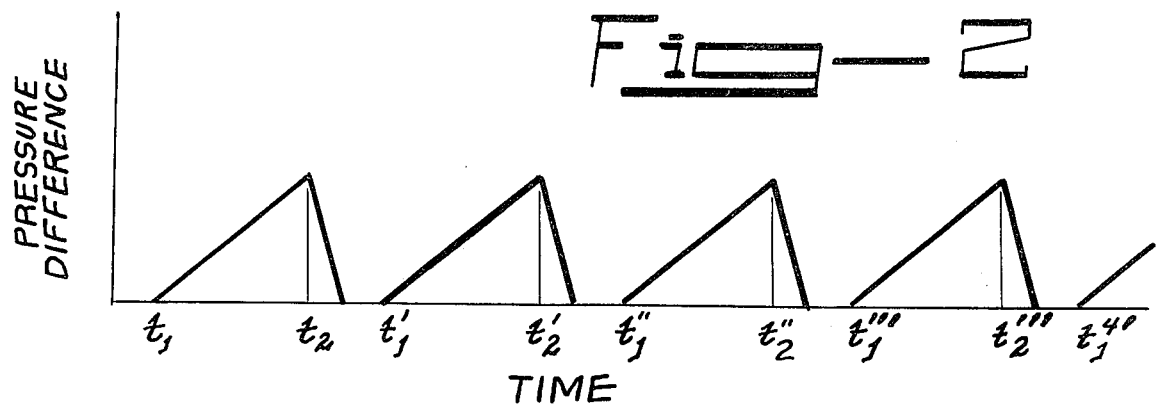
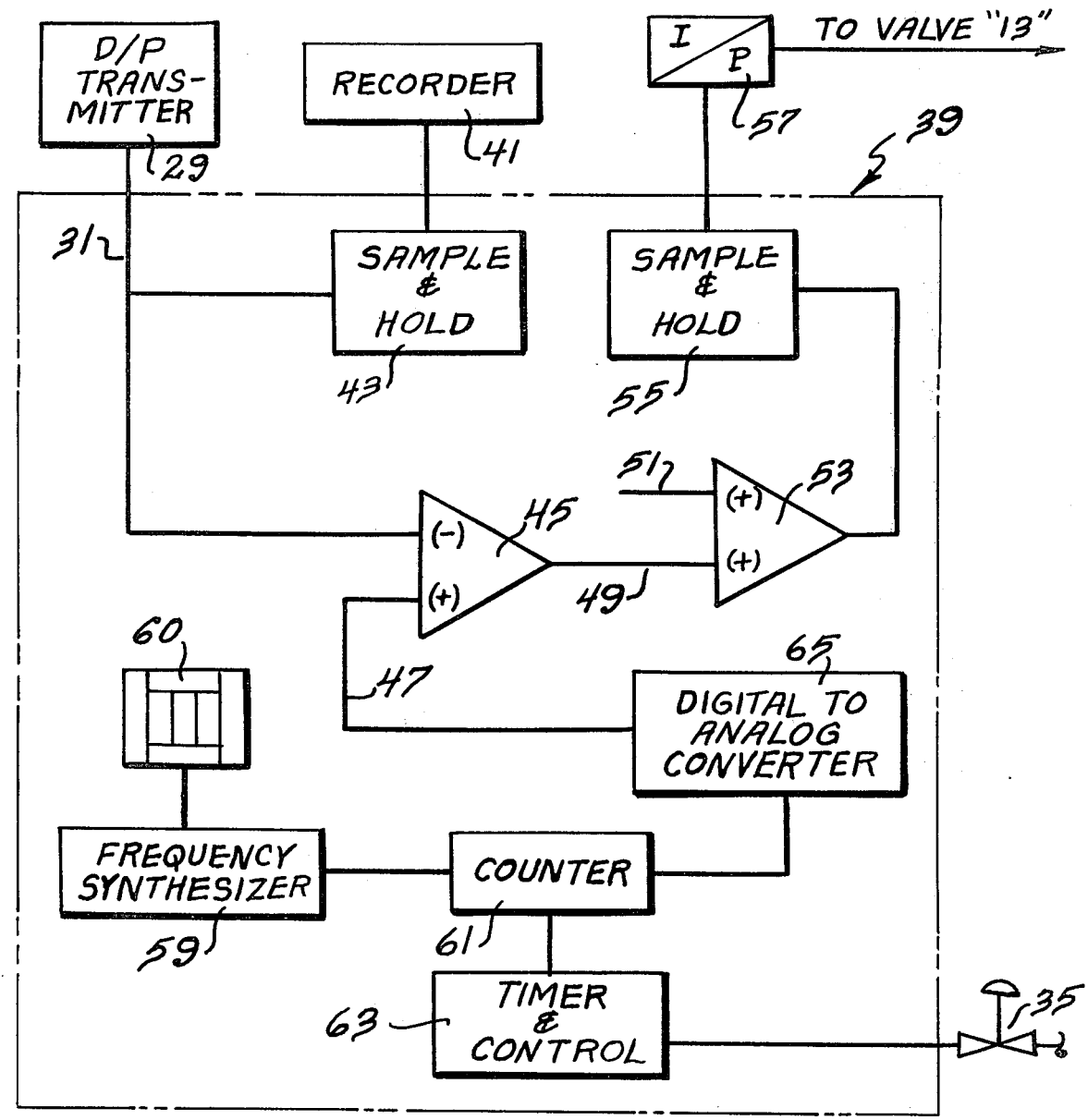

3,987,815

TANK DEPLETION FLOW CONTROLLER

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

The present invention relates to liquid flow control systems. It has particular application to monitoring and controlling the flow of liquid radioactive solutions as might be encountered in nuclear fuels reprocessing or in the flow of liquid radioactive waste material into a calcination facility.

Previous devices for flow measurement and control have included, for example, magnetic flowmeters, rotometers and in-line venturi meters. Most of these devices employ instrumentation, for instance signal amplification components, disposed in close proximity to the liquid flow stream to be monitored. Even the simple, in-line, orifice or venturi installations may become plugged or corroded to necessitate maintenance.

Maintenance of any of these devices at a location with high radiation levels must be done remotely and is therefore to be minimized or completely avoided. Complicated maintenance operations that cannot be carried out by hot-cell slave devices necessitate shutting down the process, removing the defective parts and decontaminating them before maintenance is performed in a more accessible location. These type operations are extremely difficult and expensive to perform.

Therefore, in view of these difficulties with prior art systems, it is an object of the present invention to provide a system for flow control with essentially maintenance-free components in proximity to the process fluid.

It is also an object to provide a system for controlling the flow of radioactive liquids with minimum instrumentation within radioactive locations.

SUMMARY OF THE INVENTION

In accordance with the present invention, a flow control system is provided for remotely measuring and controlling the flow rate of liquid as it is depleted from a vessel through a control valve. The control system includes two bubbler tubes positioned with open ends at first and second levels within the vessel and with their opposite end at a remote, shielded location outside the vessel. Each of the bubbler tubes is connected to a gas supply at their opposite ends for bleeding gas at a measured rate at the two levels within the vessel. The back pressure imparted at the remote location is monitored by a differential pressure transmitter that provides a signal representing the pressure difference between the first and second levels within the vessel. The control system also includes means for balancing the pressure imparted by the two bubbler tubes at equal time intervals such that the differential pressure transmitter produces a sawtooth-shaped output. A control device compares this sawtooth-shaped output with a generated signal that corresponds to the desired flow rate from the vessel. Deviations from the desired signal or flow rate are corrected by an output signal from the control device to the valve controlling liquid depletion from the vessel.

BRIEF DESCRIPTION OF THE DRAWINGS

The present invention is illustrated in the accompanying darwings wherein:

FIG. 1 is a schematic of a flow control system for controlling the flow of liquid from a vessel within a shielded process area.

FIG. 2 is a graph illustrating the sawtooth-shaped measurements of differential pressure that represent tank depletion within the flow control system of FIG. 1.

FIG. 3 is a diagrammatic representation of a controller that can be employed with the flow control system of FIG. 1.

DETAILED DESCRIPTION OF THE PREFERRED EMBODIMENTS

In FIG. 1 a flow control system is illustrated for controlling the flow of liquid 12 as it is depleted from a storage vessel 11. The depletion flow is controlled by a remotely operated valve 13 installed in the vessel 11 discharge line. Also shown is a conduit 17 with suitable valving or other controls for periodically refilling vessel 11.

Where radioactive liquids are controlled, vessel 11 and the process piping are contained within a process area that is separated from the operating area by radiation shielding material 15. Shielding material 15 is made of sufficient thickness in accordance with well established principles of radiation technology to protect equipment and personnel located within the operating area from the level of radiation within the process area. To do this, material 15 is substantially opaque to the radiation from the process.

Two bubbler tubes 19 and 21 enter vessel 11 and terminate with open ends at first and second levels for continuously discharging small volumes of inert gas into vessel 11. A suiitable vent outlet (not shown) from vessel 11 is provided for release of this gas as well as for accommodating filling and emptying operations. The first bubbler tube 19 is illustrated with an open end terminated within the gas space 23 above the liquid 12 within vessel 11. The second bubbler tube 21 is submersed within liquid 12 and terminates with an open end near the bottom portion of vessel 11. Vessel 11, as illustrated, is provided with a substantially constant diameter and constant volume per unit height over most of its height, particularly between the open ends of bubbler tubes 19 and 21.

Bubbler tubes 19 and 21 extend outside the process area through radiation shield 15 into the operating area. An inert gas supply 25 of such as nitrogen gas or air is interconnected through separate flowmeters 27A and 27B, for example rotometers, to each of the bubbler tubes 19 and 21. By bubbling small and equal flows of inert gas through bubbler tubes 19 and 21 into vessel 11 at the two different levels, the pressures within gas space 23 and at the submersed end of bubbler tube 21 are imparted as back pressures within the respective bubbler tubes. Equal gas flows and substantially equal, effective tube lengths give a consistent error resulting from gas pressure drop with flow in the two bubbler tubes. For very precise measurements, the length as well as the number of fittings and bends of bubbler tubes 19 and 21 can be made the same.

A differential pressure (D/P) transmitter 29 is illustrated with two inputs 30A and 30B coupled through a pressure balancing means described below to both bubbler tubes 19 and 21. Transmitter 29 is a commercially available instrument that provides an output 31 representative of the pressure difference imparted by the two bubbler tubes. This transmitter as well as most of the conventional control components employed within the operating area can be provided to function and to generate outputs in either pneumatic or electrical mode. However, transmitter 29 is preferably selected to provide a full output over a small range of differential pressure input from the two bubbler tubes. For good flow control accuracy, the range of transmitter 29 should be only a fraction, e.g. 0.1 to 0.01, of the difference between the first and second levels of the bubbler tube ends within vessel 11. As an example, a D/P transmitter that provides its full output on a change of 5 cm of $H_2O$ differential pressure might be employed with a vessel having 200 cm height between the two bubbler tubes where the liquid to be measured has a density fairly near that of water.

The pressure balancing means coupled between transmitter 29 and bubbler tubes 19 and 21 is made up of a number of components for balancing and equalizing the pressure between inputs 30A and 30B at uniform time intervals. The pressure balancing means includes a first and a second reservoir 33A and 33B each containing a volume of a liquid that is more dense than the liquid 12 within vessel 11. For example, reservoirs 33A and 33B may contain liquid mercury with aqueous solutions in vessel 11. Each of the reservoirs 33A and 33B comprise an elongated tubular shape with upper and lower pressure connections or outlets. The lower outlets that are ordinarily submersed in the dense liquid are interconnected through a balance line 37 containing a remotely operated valve 35.

As shown, the inputs 30A and 30B to differential pressure transmitter 29 are connected in parallel to valve 35 within lines filled with the dense liquid of reservoirs 33A and 33B. When valve 35 is open, the pressures within balance lines 37 will equalize and the liquid levels within reservoirs 33A and 33B will readjust to offset the differences in pressure between bubbler tubes 19 and 21. When this occurs, the difference in pressure imparted to differential pressure transmitter 29 will fall to zero.

FIG. 2 is presented to illustrate the output 31 of differential pressure transmitter 29 resulting from use of the pressure balancing circuit. At time $t_1$ valve 35 is closed and the pressure difference imparted as a result of depletion of liquid 12 within vessel 11 is reflected as a differential pressure ramp until time $t_2$ when valve 34 is reopened. The short time interval between time $t_2$ and time $t_1'$ when valve 35 is again closed is on the order of 5 seconds out of a total uniform time interval of, for example, 100 to 1000 seconds. This delay is provided to insure pressure balancing between the two reservoirs 33A and 33B. Repetition of the opening and closing of valve 35 over uniform time intervals produces the sawtooth-shaped output as illustrated while liquid is withdrawn from vessel 11.

A control device or controller 39 made up of conventional instrumentation components is connected to receive the output signal 31 from differential pressure transmitter 29. In order to fully describe the operation of controller 39, FIG. 3 is presented showing it in more detail. The output from the differential pressure transmitter 29 is coupled to sample and hold circuitry 43 that samples the differential pressure at or just prior to time $t_2$, illustrated in FIG. 2. This sample value is transmitted to a suitable recorder 41 where it is recorded on an appropriate scale to represent flow over the time interval $t_1$ to $t_2$.

Signal 31 is also coupled into an operational amplifier 45 where it is compared with a set point signal 47 to generate an output 49 representing error. Set point signal 47 is of a generally sawtooth or other cyclic shape and is synchronous with signal 31. The set point signal represents the desired flow over each uniform time interval.

The amplified error signal 49 from operational amplifier 45 is further modified with a bias signal 51 within a second operational amplifier 53. The output of this second amplifier 53 is transmitted through a second sample and hold circuitry 55 before being employed to operate valve 13. Sample and hold circuitry 55 provides a constant output to valve 13 during the short intervals while the valve 35 is open and the balance reservoirs 33A and 33B are equalizing the pressure. It can also be used to hold valve 13 in a constant position while refilling supply vessel 11.

Set point signal 47 can be generated by a number of techniques. Several components are illustrated for this purpose including a variable frequency synthesizer 59 (with set point adjustment 60) that generates a pulsed output to a digital counter 61. The counter is reset by a timer 63 at the end of each of a repetitive series of uniform time intervals. The output from the counter 61 is converted to an analog, time ramp signal with a generally sawtooth shape by converter 65 and employed as the set point signal 47. It will, of course, be clear that the uniform time intervals used to generate the set point signal are the same as required to operate balance valve 35 and can be used for its cycling. Small and uniform delay periods to permit complete balancing of the differential pressures can be easily accommodated with a suitably selected timer.

An electric to pneumatic converter 57 is illustrated to provide a pneumatic output to the control valve 13 — where electrical control components are employed. Also, in some instances, it may be desired to control the flow through valve 13 manually, for example during the refilling of vessel 11. For this purpose, a manual control station 67 and air supply 69 (FIG. 1) are illustrated in connection with the control line to valve 13.

In some processes it may be desirable to have at least two vessels in place of the single vessel illustrated at 11. If this is done, then continuous flow from one or the other of the two vessels can be provided through control valve 13. While one vessel is being depleted the other can be refilled. Of course, suitable remotely operated valves are required for switching from one tank to the other.

In the operation of the flow control system illustrated in FIGS. 1 and 3, vessel 11 is filled with a liquid 12 through inlet line 17 and the inlet flow is then terminated. A small flow of inert gas in equal amounts is bubbled into the vessel through each of the bubbler tubes 19 and 21. Timer 63 within controller 39 is adjusted to a suitable time interval, of, for example, 100 to 1000 seconds depending on the flow rate to begin the cycling of valve 35 during these uniform time intervals. The timer is set so that valve 35 remains closed throughout most of the uniform time interval but opens for about 5 seconds at the end of each interval to permit balancing of the reservoirs 33A and 33B containing the dense liquid, e.g. mercury. The pressures imparted by bubbler tubes 19 and 21 through the balance reservoirs to the differential pressure transmitter 29 produce a sawtooth-shaped output at 31 from the pressure transmitter. Recorder 41 records and indicates a sample value at or near the maximum of the sawtooth signal to represent flow rate from vessel 11. Within controller 39 the differential pressure output 31 is compared with a repetitive time ramp signal produced within the controller as representing the desired or set-point, flow rate. The differences between the actual flow rate and the set-point flow rate as represented by the respective signals are used to fashion a control signal to valve 13 to modify the flow rate from vessel 11.

It will be clear that various modifications can be made to the flow control system within the scope of the present invention. As an example, various components for producing control functions known to those skilled in the art can be substituted for those shown, particularly in controller 39. Either pneumatic or electrical components can be used except that pneumatically operated components, particularly valve 13, are preferred within the process area when radioactive liquids are being handled. Additional details respecting this flow system are given in Georgeson, "Tank Depletion Flow Instruments," Allied Chemical Corporation, ICP-1049, 1974.

The flow control system of the present invention is seen to provide flow control and record with only a minimum of instrumentation components contacting the process. This is of particular advantage where radioactive liquids are being processed. The system includes complicated and sophisticated control components within a shielded area where maintenance can be performed while only bubbler tubes and pneumatic valve operators are within the potentially radioactive area.

The embodiments of the invention in which an exclusive property or privilege is claimed are defined as follows:

1. A flow control system for remotely measuring and controlling liquid flow rate comprising:
    a vessel for storing said liquid, said vessel having a controllable inlet, a discharge outlet, and a first controllable valve means interconnected with said discharge outlet;
    first and second bubbler tubes, each with open ends positioned at first and second levels respectively within said vessel, each of said bubbler tubes having opposiite ends extending to a remote location outside said vessel;
    gas supply means connected to said bubbler tubes for bleeding gas into said vessel to impart pressures of said first and second levels at said remote location;
    a differential pressure transmitter at said remote location coupled to said first and said second bubbler tubes for generating a signal representing pressure difference;
    pressure balancing means for repetitively equalizing the pressures imparted by said tubes to said differential pressure transmitter at uniform time intervals and thereby producing a sawtooth-shaped signal from said differential pressure transmitter, said pressure balancing means being coupled intermediate said bubbler tubes and said differential pressure transmitter; and
    control means coupled to said differential pressure transmitter and to said first controllable valve means for monitoring said sawtooth-shaped signal during each uniform time interval as a measure of flow rate from said vessel and for controlling said first controllable valve means to regulate said flow.

2. The flow control system of claim 1 wherein said vessel contains radioactive liquid and said remote location being separated from said vessel by radiation shielding material that is substantially opaque to radiation from said radioactive liquid.

3. The flow control system of claim 1 wherein said vessel having a substantially constant diameter between said first and second levels.

4. The flow control system of claim 1 wherein the open end of said first bubbler tube being positioned above the level of said liquid and the open end of said second bubbler tube being submerged within said liquid within said vessel.

5. The flow control system of claim 1 wherein flow monitoring means are provided between said gas supply means and each of said bubbler tubes to permit substantially equal, flow-resistance, pressure drop within each of said bubbler tubes.

6. The flow control system of claim 1 wherein said control means comprises signal generating means for providing a repetitive time ramp signal in synchronization with said sawtooth-shaped signal from said differential pressure transmitter and means for comparing said generated signal with said sawtooth-shaped signal to provide a process control output to said controllable valve means.

7. The flow control system of claim 1 wherein said pressure balancing means comprises two elongated reservoirs partially filled with a second liquid of greater density than said liquid within said vessel, said reservoirs being interconnected through a second controllable valve means at the lower submerged ends thereof and each individually connected to said first and second bubbler tubes at the upper ends thereof, said differential pressure transmitter having two inputs connected one to each of said elongated reservoirs at the lower submerged ends thereof in parallel to said second controllable valve means.

8. The flow control system of claim 17 wherein said second controllable valve means being coupled to time control means for operating said second controllable valve means during each of said uniform time intervals to equalize the pressure imparted by said bubbler tubes.

* * * * *